Patented Jan. 6, 1953

2,624,675

UNITED STATES PATENT OFFICE 2,624,675

PROCESS FOR IMPROVING THE COLOR OF FERMENTED MALT BEVERAGES AND PRODUCTS OBTAINED THEREBY

James S. Wallerstein, New York, Mary Hale, Brooklyn, Ralph T. Alba, Springfield Gardens, and Hilton B. Levy, Levittown, N. Y., assignors to The Overly Biochemical Research Foundation Inc., New York, N. Y., a corporation of New York No Drawing. Application June 1, 1951, Serial No. 229,518

9 Claims. (Cl. 99—52)

The present invention relates to the manufacture of fermented malt beverages like beer and ale, and more particularly to a process for the production of beverages of this type of pale color, and to the product obtained thereby.

In the production of fermented malt beverages it is frequently desirable to obtain a product which is of pale color without in any way affecting the other properties of the beverage, such as body, flavor, palatability, foaming qualities, etc. Light-colored fermented beverages have a greater consumer appeal, especially to the American public.

During the mashing, digesting and fermentation of grain infusions various colored substances are formed which impart to the final beverage various shades of the well-known amber color. Many persons erroneously associate a deep amber color in beer, ale and similar fermented beverages with a heavy body and also with increased sweetness, and the present trend is toward what are called "light" and "dry" beers. Efforts to produce beers of lighter color have been blocked by the obscure nature of the coloring materials and their origin. The problem of producing light colored beer and ale is rendered more difficult by the fact that reduction of the color intensity must not be accompanied by any noticeable change in the flavor, palatability, body, foaming qualities and other properties that are associated with these beverages. At the same time the lightening of the color of the beverages must not be accomplished by substances whose presence affects the clarity of the beverage either at normal temperatures or at low temperatures, particularly after repeated chilling and warming and in the presence of metals having a tendency to cause turbidity in fermented beverages.

It is accordingly the principal object of the present invention to provide a process for the treatment of the infusions and worts employed in the manufacture of fermented malt beverages whereby the development of highly colored substances, or an undesirably large amount thereof, is prevented or reduced without in any way affecting the other properties of the beverage.

More specifically, it is an object of the invention to provide a process for the treatment of malt infusions and beer worts wherein a component thereof which is largely responsible for the formation of dark coloring matter is chemically altered or decomposed to such a degree as to render it incapable of forming the undesirable, highly colored material.

A still further object of the invention is to produce a fermented malt beverage, like beer and ale, which is pale in color without sacrifice of any of the other desirable properties of the beverage.

Further objects and advantages of the invention will become apparent from the following detailed disclosure thereof and the features of novelty will be set out in the appended claims.

We have found that by the addition of a cleaving enzyme capable of splitting off the carboxyl group from the dihydroxyphenylalanine which is present in malt infusions or is formed during the various digestions and the proteolysis to which the infusions and mashes are subjected, the formation of highly colored substances like melanine is prevented or substantially reduced, and a product is obtained after the subsequent fermentation which is unusually pale in color but is otherwise not affected by the added enzyme. The enzyme employed by us is of rather specific activity and is known as dihydroxyphenylalanine decarboxylase. This enzyme can be obtained from various sources, as is set out below.

According to the present invention, therefore, there is added to an infusion or a wort consisting of or containing a malt extract, and preferably at the beginning of the mashing period, a quantity of dihydroxyphenylalanine decarboxylase sufficient to decompose the dihydroxyphenylalanine compound in such manner as to render it incapable of forming dark-colored complexes and, particularly, melanine.

Our investigations have shown that whereas dihydroxyphenlalanine decarboxylase is effective in reducing the color intensity of the ultimate beverage, enzymes capable of decomposing other amino-acids were ineffective to produce any noticeable reduction in color intensity. To prove that it is in fact dihydroxyphenylalanine which is responsible for the color formation, we have added this compound to mashes and found that, in the absence of the added enzyme, the depth of color was increased, and that there was a quantitative relation between the amount of the dihydroxyphenylalanine and the intensity of color formation. Further proof of the fact that it is the dihydroxyphenylalanine which is responsible for color formation was obtained by adding mushroom tyrosinase, (the enzyme which oxidizes tyrosine to dihydroxyphenylalanine and the latter to dark-colored melanine) to a mash whereupon increase in the color intensity of the beverage resulted. Both the dihydroxyphenylalanine and tyrosinase showed a greater influence at 45° C. than at 70° C. which indicated that the reactions were enzyme-induced rather than purely chemical. The oxidation of tyrosine by tyrosinase and of dihydroxyphenylalanine by tyrosinase was found to be greatly accelerated when carried out in the presence of homogenized malt extract.

It appears that in the malt infusion there is present a sufficient quantity of malt oxidase which acts on the dihydroxyphenylalanine which is present in barley to convert it into a dark-colored product in a manner similar to tyrosinase. We established this to be the case by digesting an oxidase preparation at 45° C. with the mash. The coloration of the resulting wort was considerably intensified. The malt oxidase preparation was a crude preparation obtained by fractional salt precipitation (45–60% saturation with ammonium sulphate) and was free from protease and amylase.

Although we do not wish to be understood as being committed to this theory, it appears that tyrosine, either pre-existing in the malt or formed by proteolysis during malting and mashing, is converted by the malt oxidase through enzymatic oxidation first into dihydroxyphenylalanine and then, through a series of phenolic complexes, into a color material. The bottleneck in this series of reactions would seem to be the conversion of tyrosine into dihydroxyphenylalanine, which takes place very slowly because of the low amount of malt oxidase present. Higher temperatures in kilning and mashing which destroy the oxidase consequently operate to reduce color formation in the wort.

The effect of the dihydroxyphenylalanine decarboxylase is to remove the COOH group from the dihydroxyphenylalanine and thereby prevent subsequent polymerization and/or condensation with formation of dark-colored melanine.

We have added to brewing worts a large number of amino-acid decarboxylase enzymes from animal, plant, fungal and bacterial sources. Of these, only those preparations which contained dihydroxyphenylalanine decarboxylase had any influence on wort color and they invariably reduced the intensity of color of the treated wort when added thereto or to the original malt infusion. Smaller quantities of the enzyme can be employed with equal effectiveness to that of larger quantities if the enzyme is added in small portions during the mashing period and especially during that phase of the mashing period when the temperature range is favorable to proteolysis (40–50° C.). We prefer to employ in our process what is commonly known as the upward infusion method, wherein digestion of the malt is made to take place initially at about 45° C., after which the temperature is raised gradually to about 70° C.

Our preferred sources for the dihydroxyphenylalanine decarboxylase are *Streptococcus faecalis* and animal kidneys. It is not necessary that the enzume be isolated in more or less pure condition as we have found the crude preparations described below to be highly effective. The proportion of the crude enzyme extract that is added to the mash is very small and may range from about 1 part of the crude enzyme to from 1,000 to 10,000 of the mash or wort. The enzyme is destroyed during any subsequent boiling, as in the kettle boil. It has, however, by this time done its work in decomposing the dihydroxyphenylalanine.

Our process will be described in further detail in the following examples but it is to be understood that these are presented for purposes of illustration and not as indicating the scope of the invention.

*Example 1*

Our enzyme preparations were employed in the course of the manufacture of beer, prepared in known manner as follows:

Finely ground malt was stirred with five times its weight of water for one-half hour at 45° C.; the temperature was then raised in one-half hour to 70° C. and maintained at this value for one hour. The mash was then filtered, boiled with hops in the usual way, strained, cooled, refiltered, and stored for six weeks prior to carbonation and bottling. Color determinations were made photometrically with a Klett colorimeter.

A dihydroxyphenylalanine decarboxylase preparation was obtained from rabbit kidneys by acetone treatment of aqueous extracts. The kidneys were macerated in a container equipped with a motor-driven, rapidly-revolving cutter, such as the type known as the Waring Blender, in an iced-aqueous solution, then spun down in a Sharples centrifuge. The supernatant containing the enzyme was precipitated with 3 parts of acetone to 1 of the solution. The precipitate so obtained was dried and the resulting powder was added to the wort at the beginning of the mashing in the proportion of 1 part of the powder to 3,000 parts of the mash. The resulting wort, measured photo-colorimetrically, had only about two-thirds of the color of a non-treated control. Beer brewed from the wort was substantially lighter in color than that obtained in the known commercial methods of manufacture.

*Example 2*

A dihydroxyphenylalanine decarboxylase preparation was obtained from an aqueous extract of *Streptococcus faecalis* by acetone and fractional salt precipitation.

The *Streptococcus faecalis* was grown in a malt wort-casein hydrolysate medium for about 18 hours at 37° C. The cultures were spun down in a Sharples super centrifuge. The precipitate containing the enzyme was then washed with saline solution and then dried with acetone, then with a 50–50 acetone-ethyl ether mixture, and finally with 100% ethyl ether.

The resulting partially purified enzyme powder was added to a malt wort at the beginning of mashing in the proportion of 1 part of the enzyme to 2,000 parts of the wort. The color of the wort at the end of the mashing was only 60% of the non-treated control and the beer brewed from the wort was considerably lighter in color than beer brewed from the control mash.

We claim:

1. In a process for the manufacture of a malted beverage of reduced color intensity, the step which comprises adding a small proportion of dihydroxyphenylalanine decarboxylase to the wort prepared from the malted grain.

2. Process according to claim 1 in which the addition to the decarboxylase takes place at the beginning of the mashing.

3. Process according to claim 1 wherein the mashing is carried out by an upward infusion method which includes an initial digestion at a temperature of about 40° to 50° C.

4. Process according to claim 1 wherein the decarboxylase is added in small portions during a period of mashing which occurs at a temperature of about 40° to 50° which is favorable to proteolysis.

5. Process according to claim 1, wherein the decarboxylase is obtained by extraction from *Streptococcus faecalis*.

6. Process according to claim 1 wherein the decarboxylase is added to a wort obtained by mashing barley malt and thereafter boiling the wort with hops.

7. Process according to claim 1, wherein 1 part of a crude enzyme preparation is added to about 1,000 to 10,000 parts of the wort.

8. A wort prepared from a mash containing dihydroxyphenylalanine and wherein at least the major proportion of the dihydroxyphenylalanine is in decarboxylated condition.

9. A beer wort prepared from a mash containing dihydroxyphenylalanine and wherein at least the major proportion of the dihydroxyphenylalanine is in decarboxylated condition.

JAMES S. WALLERSTEIN.
MARY HALE.
RALPH T. ALBA.
HILTON B. LEVY.

REFERENCES CITED

The following references are of record in the file of this patent:

"The Enzymes" by J. B. Sumner & K. Myrback, vol. 1, Part 1, published by Academic Press, Inc., New York, 1950, pages 103, 251.